(12) United States Patent
Yang et al.

(10) Patent No.: US 8,052,162 B2
(45) Date of Patent: Nov. 8, 2011

(54) VEHICLE STEP APPARATUS AND EXTENDING AND RETRACTING DEVICE THEREFOR

(75) Inventors: Huizhong Yang, Hang Zhou (CN); Lingling Yang, Hang Zhou (CN)

(73) Assignee: T-Max (Hangzhou) Industrial Co., Ltd. (CN)

( * ) Notice: Subject to any disclaimer, the term of this patent is extended or adjusted under 35 U.S.C. 154(b) by 635 days.

(21) Appl. No.: 12/140,355

(22) Filed: Jun. 17, 2008

(65) Prior Publication Data

US 2009/0295114 A1    Dec. 3, 2009

(30) Foreign Application Priority Data

Jun. 3, 2008    (CN) .......................... 2008 1 0110563

(51) Int. Cl.
*B60R 3/00* (2006.01)
*B60R 3/02* (2006.01)
(52) U.S. Cl. ....................... 280/166; 280/163
(58) Field of Classification Search ................. 180/90.6; 280/163, 164.1, 165, 166
See application file for complete search history.

(56) References Cited

U.S. PATENT DOCUMENTS

| | | | | |
|---|---|---|---|---|
| 32,460 A * | 6/1861 | Betts | ............................ | 280/166 |
| 115,664 A * | 6/1871 | Vollhardt | ..................... | 280/166 |
| 125,235 A * | 4/1872 | Wells | ............................ | 280/166 |
| 752,031 A * | 2/1904 | Chadwick | ..................... | 280/166 |
| 1,052,364 A * | 2/1913 | Morris | ........................ | 105/449 |
| 1,146,559 A * | 7/1915 | Fuller | .......................... | 105/437 |
| 1,182,563 A * | 5/1916 | Coop | .............................. | 182/89 |
| 1,487,408 A * | 3/1924 | Tichy | ............................ | 280/166 |
| 2,118,557 A * | 5/1938 | Hamilton | ...................... | 280/166 |
| 3,528,574 A * | 9/1970 | Denner et al. | ................ | 414/558 |
| 3,833,240 A * | 9/1974 | Weiler | .......................... | 280/166 |
| 3,887,217 A * | 6/1975 | Thomas | ........................ | 280/166 |
| 3,955,827 A * | 5/1976 | Wonigar | ....................... | 280/166 |
| 4,073,502 A * | 2/1978 | Frank et al. | .................... | 280/166 |
| 4,110,673 A * | 8/1978 | Magy et al. | .................. | 318/466 |
| 4,982,974 A * | 1/1991 | Guidry | ....................... | 280/164.2 |
| 5,538,269 A * | 7/1996 | McDaniel et al. | ............ | 280/166 |
| 6,641,158 B2* | 11/2003 | Leitner | ........................ | 280/166 |
| 6,830,257 B2* | 12/2004 | Leitner | ........................ | 280/166 |
| 6,834,875 B2* | 12/2004 | Leitner et al. | ................ | 280/166 |

(Continued)

FOREIGN PATENT DOCUMENTS

CA    2438489 A    10/2002

(Continued)

*Primary Examiner* — Jeffrey J Restifo
*Assistant Examiner* — Jacob Meyer
(74) *Attorney, Agent, or Firm* — Bliss McGlynn, P.C.

(57) ABSTRACT

A vehicle step includes a step member and first and second extending and retracting devices connected to the step member for moving it between extended and retracted positions. Each of the extending and retracting devices includes a mounting bracket adapted to be fixed to a vehicle body, a step bracket connected to the step member, first and second arms each defining a lower end rotatably connected to the step bracket and an upper end, and a third arm defining an upper end rotatably connected to the mounting bracket and a lower end rotatably connected to the upper end of the first or second arm. The upper end of the other of the first or second arm is rotatably connected to the mounting bracket. The vehicle step includes also driving devices that drive respectively the extending and retracting devices to move the step member between the extended and retracted positions.

18 Claims, 13 Drawing Sheets

U.S. PATENT DOCUMENTS

| | | | | |
|---|---|---|---|---|
| 6,938,909 | B2 * | 9/2005 | Leitner | 280/166 |
| 6,942,233 | B2 * | 9/2005 | Leitner et al. | 280/166 |
| 7,007,961 | B2 * | 3/2006 | Leitner et al. | 280/166 |
| 7,055,839 | B2 * | 6/2006 | Leitner | 280/166 |
| 7,118,120 | B2 | 10/2006 | Lee et al. | 280/166 |
| 7,163,221 | B2 | 1/2007 | Leitner | 280/166 |
| 7,287,771 | B2 * | 10/2007 | Lee et al. | 280/166 |
| 7,367,574 | B2 | 5/2008 | Leitner | 280/166 |
| 7,380,807 | B2 * | 6/2008 | Leitner | 280/166 |
| 7,398,985 | B2 * | 7/2008 | Leitner et al. | 280/166 |
| 7,413,204 | B2 * | 8/2008 | Leitner | 280/163 |
| 7,441,790 | B2 * | 10/2008 | Lechkun | 280/166 |
| 7,487,986 | B2 * | 2/2009 | Leitner et al. | 280/166 |
| 7,566,064 | B2 * | 7/2009 | Leitner et al. | 280/166 |
| 7,584,975 | B2 * | 9/2009 | Leitner | 280/166 |
| 7,621,546 | B2 * | 11/2009 | Ross et al. | 280/166 |
| 7,712,755 | B2 * | 5/2010 | Yang et al. | 280/163 |
| 7,740,260 | B2 * | 6/2010 | VanBelle et al. | 280/166 |
| 7,740,261 | B2 * | 6/2010 | Leitner et al. | 280/166 |
| 7,744,106 | B2 * | 6/2010 | VanBelle et al. | 280/166 |
| 2002/0113400 | A1 * | 8/2002 | Leitner | 280/166 |
| 2003/0184040 | A1 * | 10/2003 | Leitner et al. | 280/166 |
| 2004/0084868 | A1 * | 5/2004 | Leitner et al. | 280/166 |
| 2004/0124601 | A1 * | 7/2004 | Leitner | 280/166 |
| 2005/0077697 | A1 * | 4/2005 | Leitner | 280/166 |
| 2005/0087951 | A1 * | 4/2005 | Leitner et al. | 280/166 |
| 2005/0104318 | A1 * | 5/2005 | Lee et al. | 280/166 |
| 2005/0179227 | A1 * | 8/2005 | Leitner | 280/163 |
| 2005/0280242 | A1 * | 12/2005 | Fabiano et al. | 280/164.1 |
| 2006/0091638 | A1 * | 5/2006 | Leitner et al. | 280/166 |
| 2006/0125204 | A1 * | 6/2006 | Leitner et al. | 280/166 |
| 2006/0202441 | A1 * | 9/2006 | Leitner | 280/163 |
| 2007/0108720 | A1 * | 5/2007 | Leitner | 280/166 |
| 2007/0278760 | A1 * | 12/2007 | VanBelle et al. | 280/166 |
| 2008/0054586 | A1 * | 3/2008 | Lechkun | 280/166 |
| 2008/0100024 | A1 * | 5/2008 | Leitner et al. | 280/166 |
| 2008/0100025 | A1 * | 5/2008 | Leitner et al. | 280/166 |
| 2008/0116653 | A1 * | 5/2008 | Piotrowski | 280/166 |
| 2008/0191445 | A1 * | 8/2008 | Yang et al. | 280/166 |
| 2008/0271936 | A1 * | 11/2008 | Kuntze et al. | 180/90.6 |
| 2008/0290626 | A1 * | 11/2008 | Leitner | 280/166 |
| 2009/0072508 | A1 * | 3/2009 | Leitner et al. | 280/166 |
| 2009/0250896 | A1 * | 10/2009 | Watson | 280/166 |
| 2010/0059962 | A1 * | 3/2010 | Leitner et al. | 280/166 |

FOREIGN PATENT DOCUMENTS

| | | |
|---|---|---|
| CA | 2463717 A | 5/2003 |
| CA | 2475492 A | 1/2005 |
| CN | 1652955 A | 8/2005 |
| CN | 101020434 A | 8/2007 |
| JP | 8-132967 A | 5/1996 |
| WO | WO02/085670 A2 | 10/2002 |
| WO | WO 03/039910 | 5/2003 |

* cited by examiner

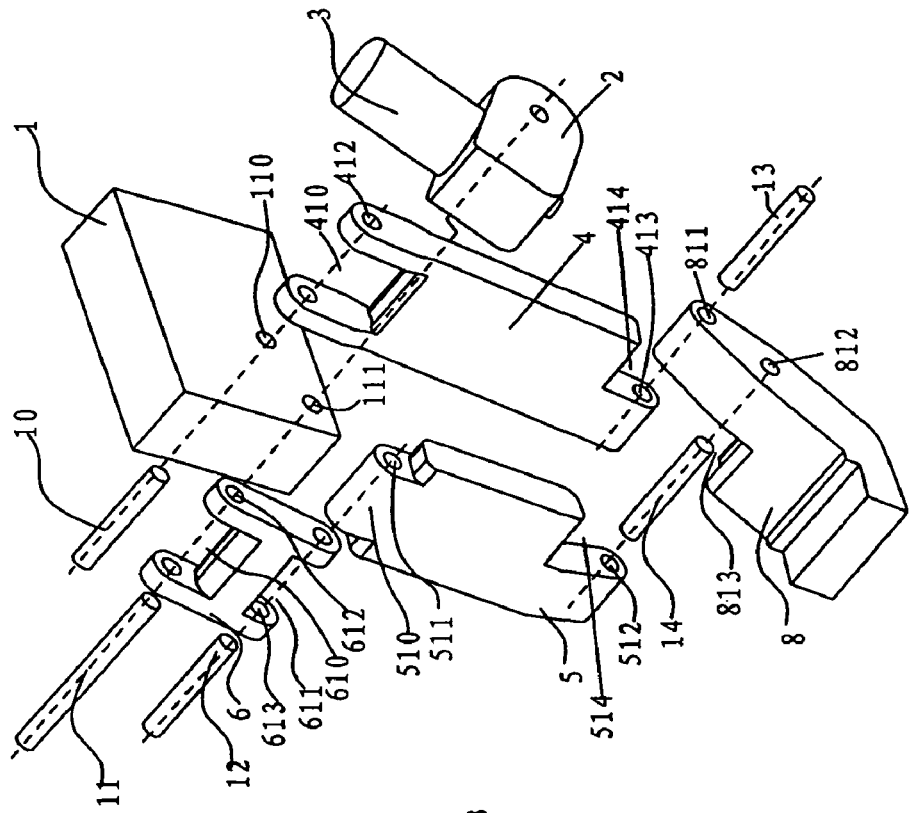
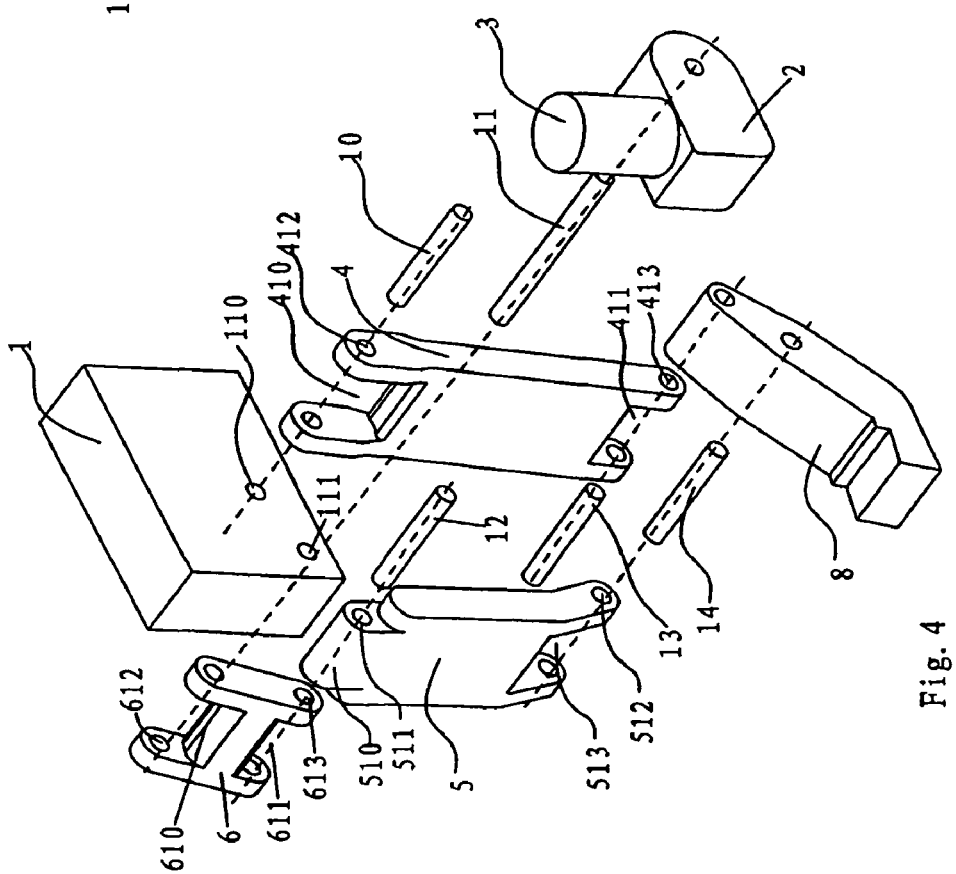
Fig. 5
Fig. 4

VEHICLE STEP APPARATUS AND EXTENDING AND RETRACTING DEVICE THEREFOR

BACKGROUND OF THE INVENTION

1. Field of the Invention

The present invention relates, generally, to a vehicle body and, more particularly, to a step of the vehicle body and an extending and retracting device for the step.

2. Description of the Related Art

A step under a door of a vehicle is used for a passenger to get on or off the vehicle. In terms of ergonomics, the vehicle step is generally mounted at a level of 15 cm with respect to the ground so that it is convenient for the passenger to get on or off it, but this level does not provide sufficient ground clearance during operation of many vehicles. The level of the vehicle step should be higher than ground clearance of the vehicle. Therefore, it is difficult to meet ground-clearance and convenience requirements simultaneously with a conventional vehicle step.

U.S. Pat. No. 6,830,257 discloses a retractable vehicle step employing a four-link mechanism. When a door of a vehicle is opened, the vehicle step is automatically extended out downwardly from the chassis of the vehicle near the board of the body of the vehicle so that a passenger can step on the extended vehicle step. When the vehicle door is closed, the vehicle step is automatically retracted upwardly to its original position, thus not affecting disadvantageously ground clearance of the vehicle.

The retractable vehicle step disclosed in U.S. Pat. No. 6,830,257 employs one motor to drive a pair of four-link mechanisms used to deploy and retract a step member. Since the pair of four-link mechanisms is driven by one motor, a driving force applied to the retractable vehicle step is not balanced, and rotations of two four-link mechanisms of the retractable vehicle step are not synchronous so that operation of the retractable vehicle step is not reliable. If a conventional four-link retractable vehicle step employs two motors to drive the two four-link mechanisms simultaneously, rotations of the two motors and/or four-link mechanisms may not be synchronous so that the four-link mechanisms may interfere with each other. The retractable vehicle step may be destroyed due to the interference and fail to operate. Thus, there is a need in the related art for a retractable vehicle step that is stable and not subject to these deficiencies and operation of which is reliable.

SUMMARY OF THE INVENTION

The present invention overcomes the disadvantages in the related art in a vehicle step apparatus. The vehicle step apparatus includes a step member and first and second extending and retracting devices connected to the step member for moving the step member between an extended position and a retracted position. Each of the first and second extending and retracting devices includes a mounting bracket adapted to be fixed to a body of a vehicle, a step bracket connected to the step member, a first arm defining a lower end portion thereof rotatably connected to the step bracket and an upper end portion thereof, a second arm defining a lower end portion thereof rotatably connected to the step bracket and an upper end portion thereof, and a third arm defining an upper end portion thereof rotatably connected to the mounting bracket and a lower end portion thereof rotatably connected to the upper end portion of the first or second arm. The upper end portion of the other of the first or second arm is rotatably connected to the mounting bracket. The vehicle step apparatus includes also first and second driving devices that drive respectively the first and second extending and retracting devices to move the step member between the extended and retracted positions.

One advantage of the vehicle step apparatus of the present invention is that it employs a five-link mechanism, is reliable and stable with a long operational life, and eliminates interference occurring between the two extending and retracting devices.

Another advantage of the vehicle step apparatus of the present invention is that its freedom of movement is increased and it employs the two driving devices to drive respectively the two extending and retracting devices with increased driving force.

Another advantage of the vehicle step apparatus of the present invention is that even if rotations of the two driving devices and/or extending and retracting devices are not synchronous, asynchronization can be compensated by relative rotation between the third arm and first or second arm.

Other objects, features, and advantages of the present invention will be readily appreciated as the same becomes better understood while reading the subsequent description taken in conjunction with the accompanying drawings.

BRIEF DESCRIPTION OF THE DRAWINGS

FIG. 4 is an exploded schematic view of a second embodiment of the extending and retracting device for a vehicle step apparatus of the present invention.

FIG. 5 is an exploded schematic view of a third embodiment of the extending and retracting device for a vehicle step apparatus of the present invention.

DETAILED DESCRIPTION OF THE INVENTION

An extending and retracting device for a vehicle step apparatus of the present invention is shown in FIGS. 1 through 12, and a vehicle step apparatus using the extending and retracting device is shown in FIGS. 13 through 18. In the figures, like numerals are used to designate like structure throughout various embodiments of each of the device and apparatus disclosed herein. Embodiments of the extending and retracting device and the vehicle step apparatus using the device of to the present invention are described hereinafter with reference to the figures. The embodiments are exemplary only and cannot be construed to limit the present invention. In the description of the present invention that follows, it should be noted that the terminologies "first," "second," "third," "upper," and "lower" are used only to describe the present invention conveniently and cannot be construed to limit the present invention. Although the extending and retracting device is designed to be used in connection with the vehicle step apparatus described below, those having ordinary skill in the related art should appreciate that the extending and retracting device can be used in connection with any suitable vehicle step.

Figure 1:
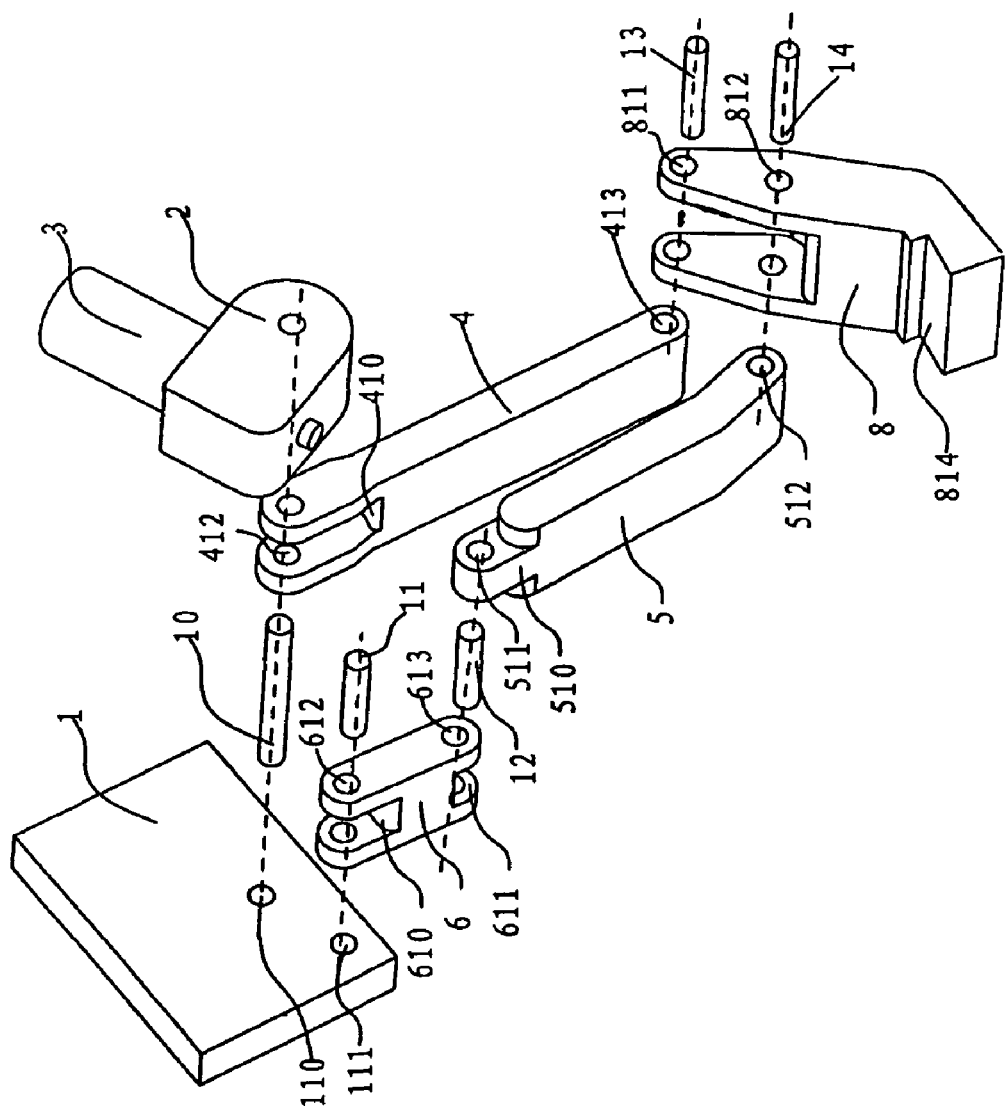
FIG. 1 is an exploded schematic view of a first embodiment of the extending and retracting device for a vehicle step apparatus of the present invention.
Figure 3:
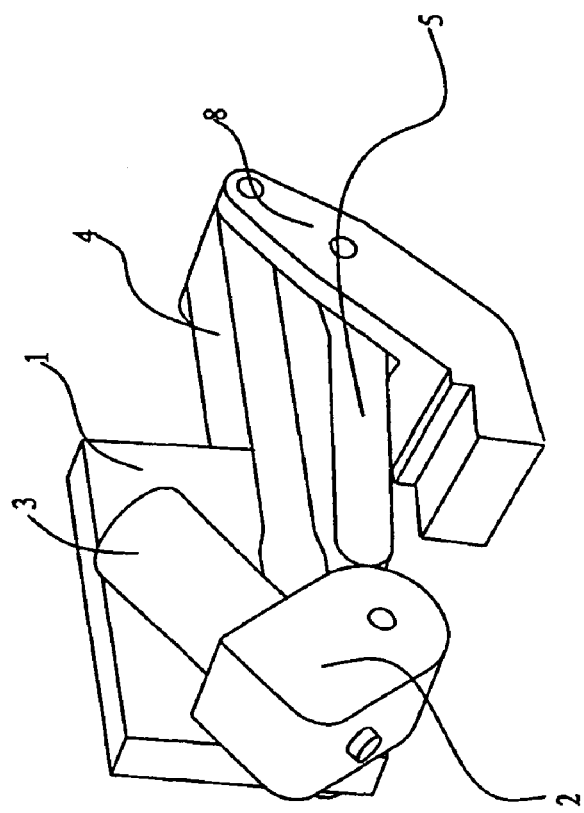
FIG. 3 is a schematic view of the first embodiment of the extending and retracting device for a vehicle step apparatus of the present invention shown disposed in a retracted state.
Figure 2:
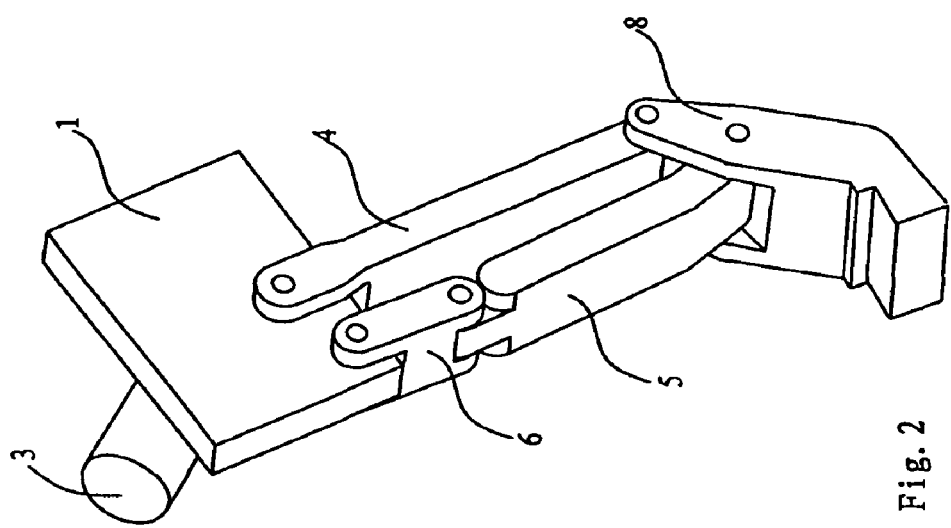
FIG. 2 is a schematic view of the first embodiment of the extending and retracting device for a vehicle step apparatus of the present invention shown disposed in an extended state.
Figure 13:
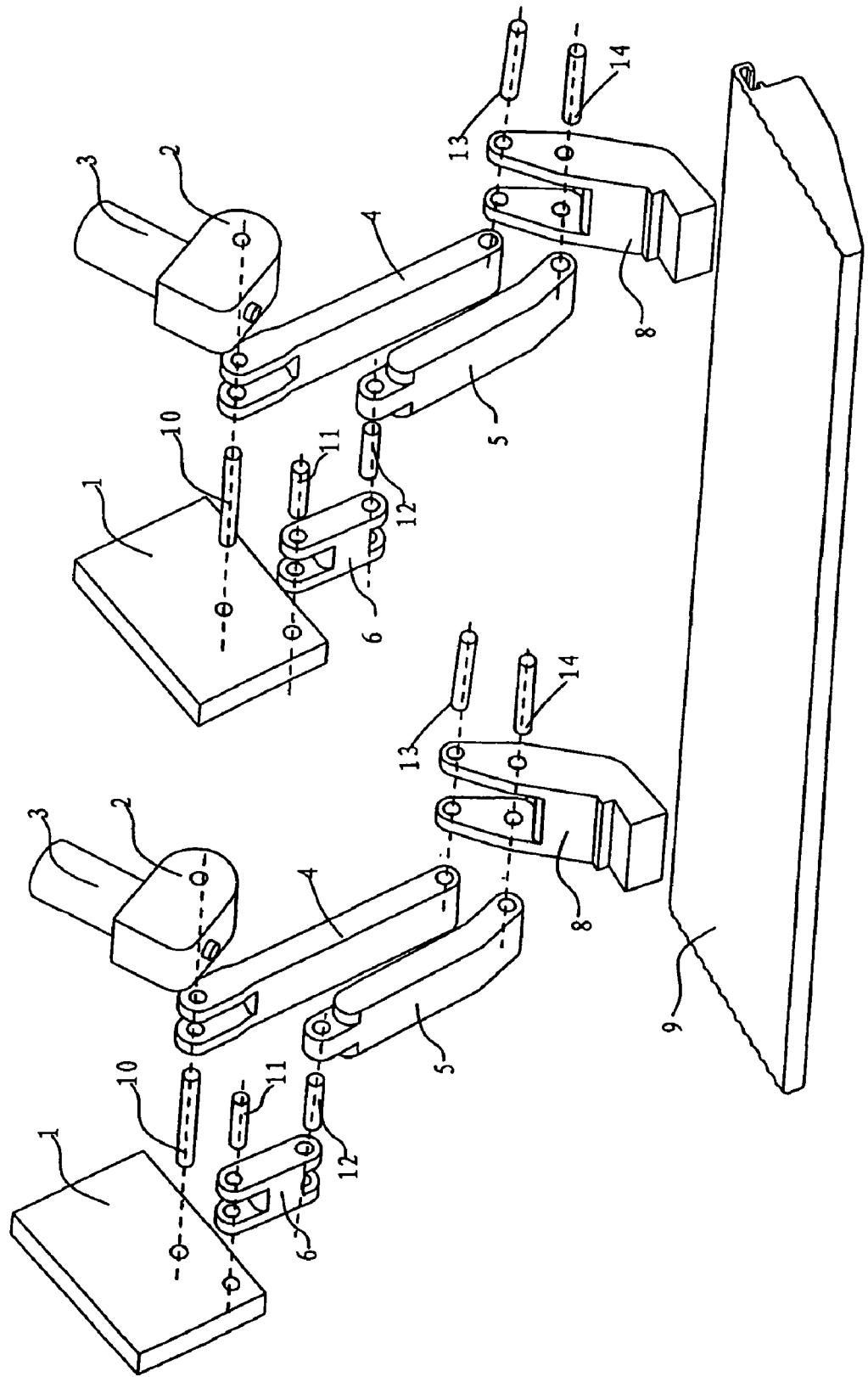
FIG. 13 is an exploded schematic view of a first embodiment of the vehicle step apparatus of the present invention.

With reference to FIGS. 1-3, a first embodiment of the extending and retracting device for a vehicle step apparatus of the present invention will now be described. The first embodiment generally includes a mounting bracket 1 adapted to be fixed to a body of a vehicle (not shown). A step bracket 8 is adapted to be connected to a step member 9 (as shown in FIG. 13) of the vehicle step apparatus. A first arm 4 defines a lower end portion rotatably connected to the step bracket 8 and an upper end portion. A second arm 5 defines a lower end portion rotatably connected to the step bracket 8 and an upper end portion. A third arm 6 defines an upper end portion rotatably connected to the mounting bracket 1 and a lower end portion rotatably connected to the upper end portion of the first arm 4 or second arm 5. The upper end portion of the other of the first arm 4 or second arm 5 is rotatably connected to the mounting bracket 1. The mounting bracket 1 can be mounted to the body of the vehicle so as to mount the extending and retracting device onto the vehicle.

More specifically and as shown in FIG. 1, the lower end portion of the first arm 4 is rotatably connected to the step bracket 8. In particular, the lower end portion of the first arm 4 is formed with through-hole 413, and each side wall of the step bracket 8 is formed with through-hole 811. Pin 13 is received in through-holes 413, 811 so that the first arm 4 is pivotably connected via pin 13 to the step bracket 8.

The upper end portion of the first arm 4 is rotatably connected to the mounting bracket 1. As shown in FIG. 1, groove 410 is formed in the upper end portion of the first arm 4, and the mounting bracket 1 is inserted into groove 410 such that the mounting bracket 1 and first arm 4 can rotate with respect to each other. In particular, each side wall of the upper end portion of the first arm 4 defined by groove 410 is formed with through-hole 412, and the mounting bracket 1 is formed with through-hole 110. Pin 10 is received in through-holes 412, 110 so that the upper end portion of the first arm 4 is pivotably connected via pin 10 to the mounting bracket 1.

As shown in FIG. 1 and similar to the first arm 4, the lower end portion of the second arm 5 is rotatably connected to the step bracket 8. In particular, the lower end portion of the second arm 5 is formed with through-hole 512, and each side wall of the step bracket 1 is formed with through-hole 812. Pin 14 is received in through-holes 512, 812 so that the second arm 5 is pivotably connected via pin 14 to the step bracket 8.

The step member 9 can be mounted on the step bracket 8. In particular, the step bracket 8 is formed with an extension portion 814 at the lower end so that the step member 9 can be mounted on the extension portion 814.

The lower end portion of the third arm 6 is rotatably connected to the upper end portion of the second arm 5. As shown in FIG. 1, groove 611 is formed in the third arm 6, and the upper end portion of the second arm 5 is rotatably inserted into groove 611. In particular, each side wall of the lower end portion of the third arm 6 defined by groove 611 is formed with through-hole 613, and a protrusion portion 510 (the width of which is decreased with respect to that of the remainder of the second arm 5) is formed on the upper end portion of the second arm 5 and with through-hole 511. Pin 12 is received in through-holes 613, 511 so that the lower end portion of the third arm 6 is pivotably connected via pin 12 to the upper end portion of the second arm 5.

The upper end portion of the third arm 6 is rotatably connected to the mounting bracket 1. As shown in FIG. 1, groove 610 is formed in the upper end portion of the third arm 6, and the mounting bracket 1 is inserted into groove 610 so that the third arm 6 can be rotated with respect to the mounting bracket 1. In particular, each side wall of the upper end portion of the third arm defined by groove 610 is formed with through-hole 612, and the mounting bracket 1 is formed with through-hole 111. Pin 11 is received in through-holes 612, 111 so that the upper end portion of the third arm 6 is pivotably connected via pin 11 to the mounting bracket 1.

In FIG. 1, a driving device for driving the extending and retracting device is also shown. In one embodiment, the driving device may include a reversible motor 3 and a speed reducer 2. In particular, an output shaft of the speed reducer 2 is connected to pin 10 so as to drive pin 10 and cause the first arm 4 to rotate so that the driving device drives the first arm 4 to move the extending and retracting device between an extended state and a retracted state. In this way, the step member 9 is moved between the extended and retracted positions.

Figure 14:
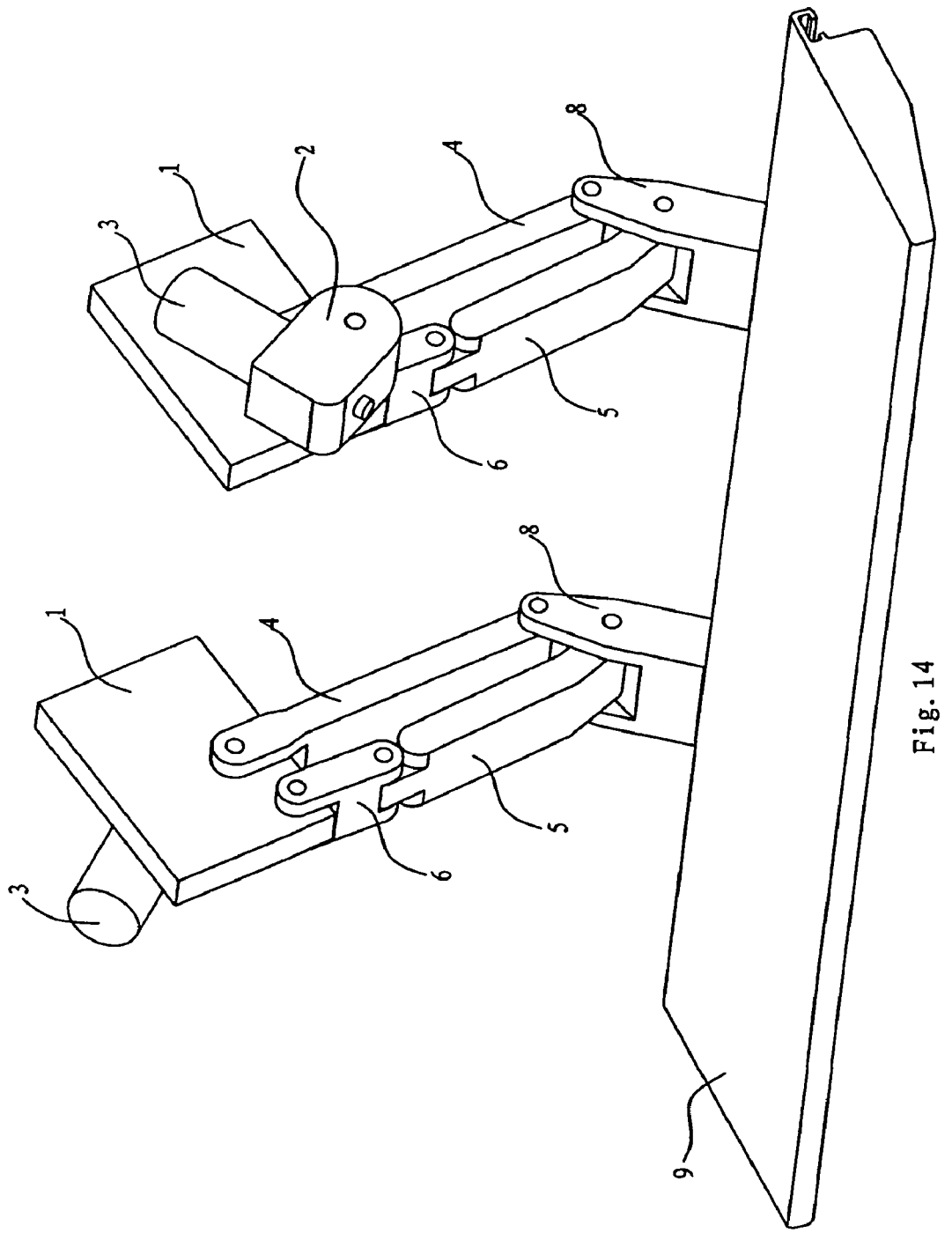
FIG. 14 is a schematic view of the first embodiment of the vehicle step apparatus of the present invention shown disposed in an extended state with the step member being in an extended position.
Figure 15:
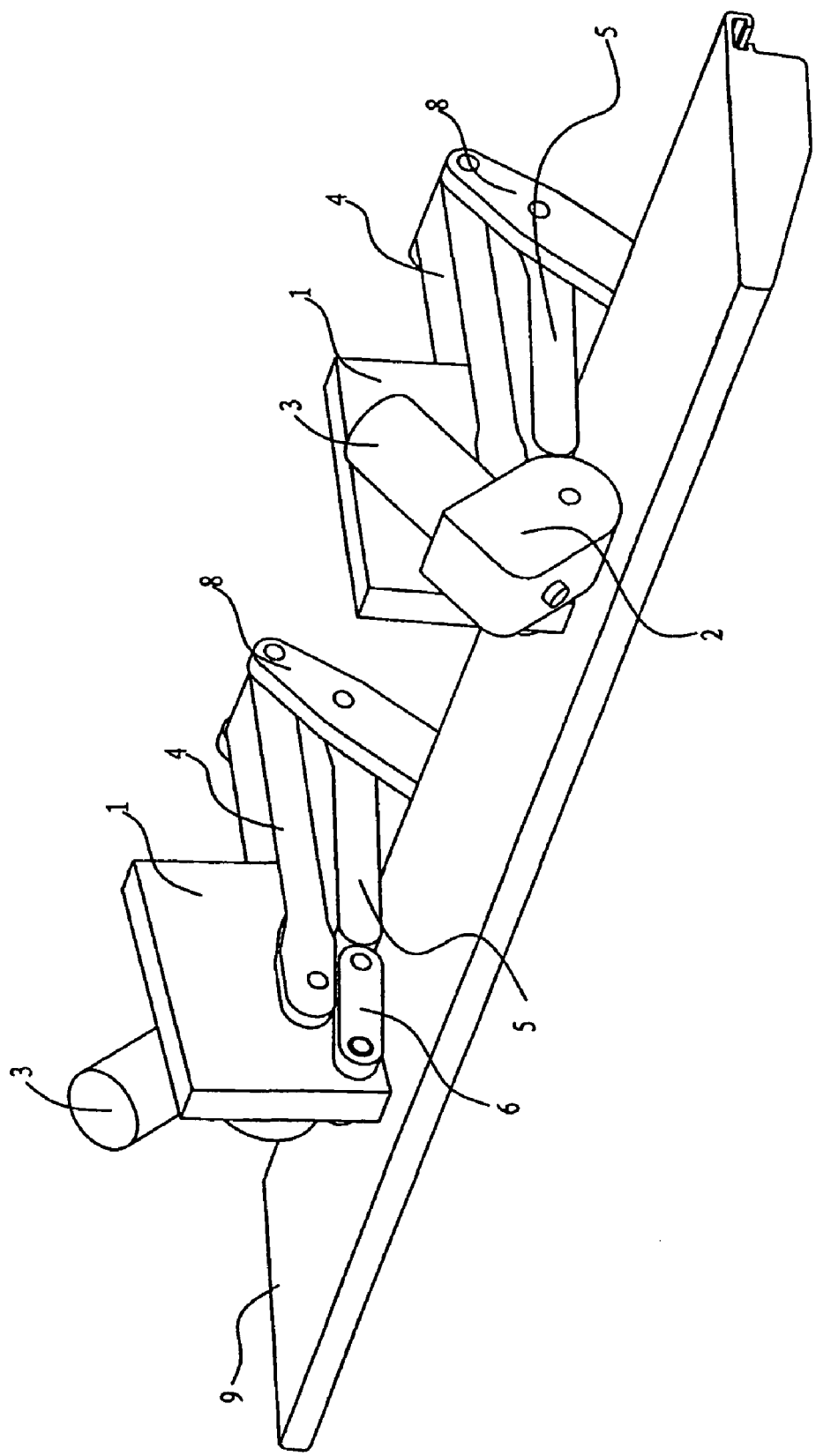
FIG. 15 is a schematic view of the first embodiment of the vehicle step apparatus of the present invention shown disposed in a retracted state with the step member being in a retracted position.

FIG. 2 shows the extending and retracting device disposed in the extended state in which the step member 9 is connected to the step bracket 8 in an extended position (as shown in FIG. 14). FIG. 3 shows the extending and retracting device disposed in the retracted state in which the step member 9 is connected to the step bracket 8 in a retraced position (as shown in FIG. 15).

In operation of the first embodiment of the extending and retracting device and as shown in FIGS. 2 and 3, when it is required to move the extending and retracting device from the extended state (as shown in FIG. 2) to the retracted state (as shown in FIG. 3), the reversible motor 3 rotates the first arm 4 in counter-clockwise direction (as viewed in FIG. 2) with respect to the mounting bracket 1 via the speed reducer 2, thus driving the second arm 5 and third arm 6 to rotate with respect to the mounting bracket 1 so that the step bracket 8 moves upwardly and rearwardly with respect to the mounting bracket 1. In this way, the extending and retracting device moves to its retracted state (as shown in FIG. 3). Through reversed rotation of the motor 3, the extending and retracting device can move from the retracted state (as shown in FIG. 3) to the extended state (as shown in FIG. 2).

It should be appreciated by those having ordinary skill in the related art that in the first embodiment of the extending and retracting device, each of the mounting bracket 1, speed reducer 2, reversible motor 3, first arm 4, second arm 5, third arm 6, step bracket 8, pins 10, 11, 12, 13, 14, protrusion portion 510, and extension portion 814 can have any suitable shape, size, and structure. It should also be appreciated that each of the through-holes 110, 111, 412, 413, 511, 512, 612, 613, 811, 812 and grooves 410, 610, 611 can have any suitable shape and size. It should also be appreciated also that each of the mounting bracket 1, speed reducer 2, reversible motor 3, first arm 4, second arm 5, third arm 6, step bracket 8, step member 9, pins 10, 11, 12, 13, 14, protrusion portion 510, extension portion 814, through-holes 110, 111, 412, 413, 511, 512, 612, 613, 811, 812, and grooves 410, 610, 611 can have any suitable structural relationship with each other and the step member 9 and body of the vehicle.

With reference to FIG. 4, a second embodiment of the extending and retracting device for a vehicle step apparatus of the present invention will now be described. Those having ordinary skill in the related art should appreciate that structure and operation of the second embodiment is similar to those of the first embodiment. Accordingly, the description that follows focuses upon differences between the first and second embodiments.

In the second embodiment, groove 411 is formed in the lower end portion of the first arm 4, and groove 513 formed in the lower end portion of the second arm 5. The step bracket 8 is inserted into grooves 411, 513. In particular, the step bracket 8 is pivotably connected to the respective lower end portions of the first arm 4 and second arm 5 via corresponding pins 13, 14. Otherwise, the second embodiment illustrated in FIG. 4 functions the same as the first embodiment illustrated in FIGS. 1-3.

With reference to FIG. 5, a third embodiment of the extending and retracting device for a vehicle step apparatus of the present invention will now be described. Those having ordinary skill in the related art should appreciate that structure and operation of the third embodiment is similar to those of the first or second embodiment. Accordingly, the description that follows focuses upon differences between the first or second and third embodiments.

In the third embodiment, the respective lower end portions of the first arm 4 and second arm 5 are juxtaposed with respect to each other and connected to the step bracket 8. In other words, the respective lower end portions of the first arm 4 and second arm 5 are connected to the step bracket 8 side by side with respect to each other. A notch 414 is formed in the lower end portion of the first arm 4 such that the lower end portion of the first arm 4 is formed as a width-reduced protrusion portion, a notch 514 is formed in the lower end portion of the second arm 5 such that the lower end portion of the second arm 5 is formed as a width-reduced protrusion portion, and a notch 813 is formed in an upper portion of the step bracket 8 such that the upper portion of the step bracket 8 is formed as a width-reduced protrusion portion. In this way, the respective lower end portions of the first arm 4 and second arm 5 are connected via corresponding pins 13, 14 to the step bracket 8 side by side with respect to each other.

However, those having ordinary skill in the related art should appreciate that the respective lower end portions of the first arm 4 and second arm 5 and the upper portion of the step bracket 8 can be formed with no notches. Alternatively, the respective lower end portions of the first arm 4 and second arm 5 may be juxtaposed to the upper portion of the step bracket 8 directly. The term "juxtaposed" as used herein means that the step bracket 8 is not inserted into the first arm 4 and second arm 5 (as compared to the step bracket 8 of the second embodiment). Namely, the respective lower end portions of the first arm 4 and second arm 5 are connected to the step bracket 8 side by side with respect to each other.

Figure 6:
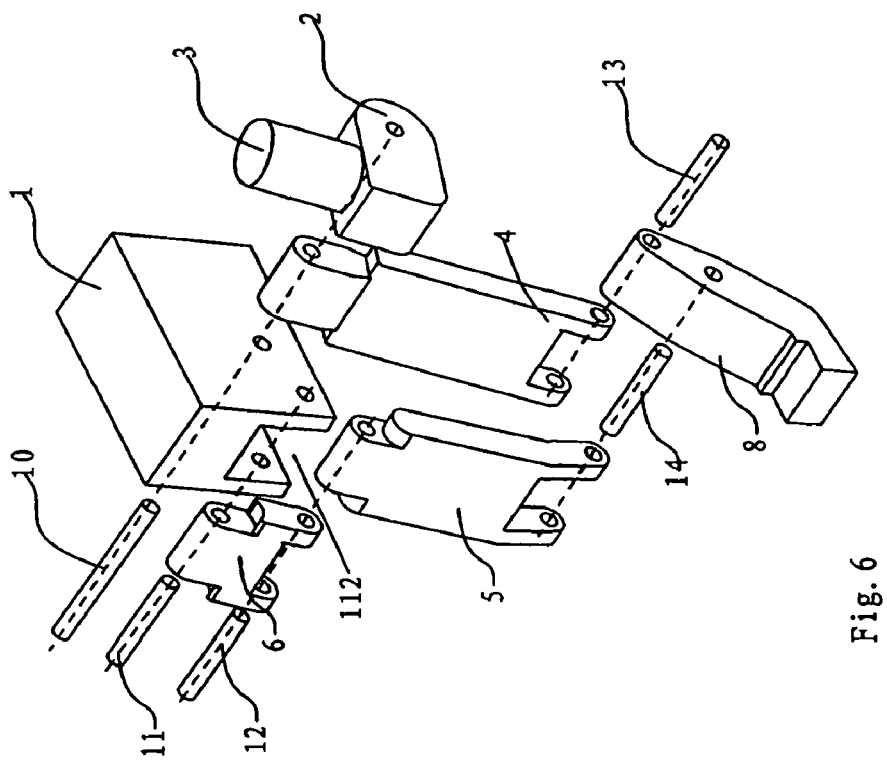
FIG. 6 is an exploded schematic view of a fourth embodiment of the extending and retracting device for a vehicle step apparatus of the present invention.

With reference to FIG. 6, a fourth embodiment of the extending and retracting device for a vehicle step apparatus of the present invention will now be described. Those having ordinary skill in the related art should appreciate that structure and operation of the fourth embodiment is similar to those of the first or second embodiment. Accordingly, the description that follows focuses upon differences between the first or second and fourth embodiments.

In the fourth embodiment, the mounting bracket 1 is formed with recess 112, and the upper end portion of the third arm 6 is rotatably inserted into recess 112. In particular, the upper end portion of the third arm 6 is pivotably connected to the mounting bracket 1 in recess 112 via pin 11. The upper end portion of the first arm 4 is rotatably inserted into recess 112. In particular, the upper end portion of the first arm 4 is pivotably connected to the mounting bracket 1 in recess 112 via pin 10. Not by way of limitation, the width of the respective upper end portions of the third arm 6 and first arm 4 is reduced such that they adapt to recess 112.

Figure 7:
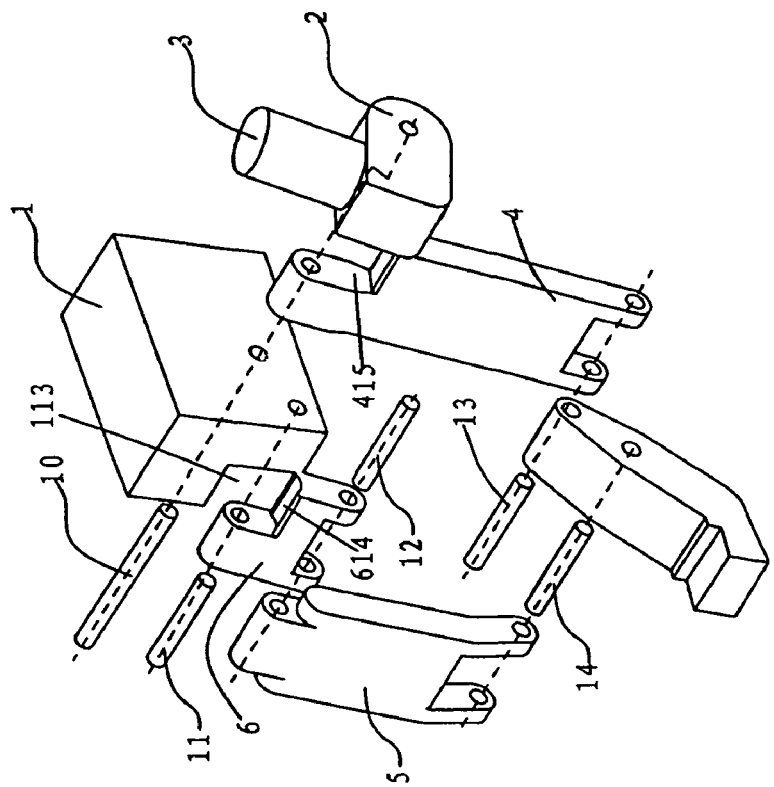
FIG. 7 is an exploded schematic view of a fifth embodiment of the extending and retracting device for a vehicle step apparatus of the present invention.

With reference to FIG. 7, a fifth embodiment of the extending and retracting device for a vehicle step apparatus of the present invention will now be described. Those having ordinary skill in the related art should appreciate that structure and operation of the fifth embodiment is similar to those of the fourth embodiment. Accordingly, the description that follows focuses upon differences between the fourth and fifth embodiments.

In the fifth embodiment, the respective upper end portions of the first arm 4 and third arm 6 are juxtaposed with respect to each other and connected to the mounting bracket 1. In other words, the respective upper end portions of the first arm 4 and third arm 6 are connected to the mounting bracket 1 side by side with respect to each other. A notch 415 is formed in the upper end portion of the first arm 4 such that the upper end portion of the first arm 4 is formed as a width-reduced protrusion portion, a notch 614 is formed in the upper end portion of the third arm 6 such that the upper end portion of the third arm 6 is formed as a width-reduced protrusion portion, and a notch 113 is formed in a lower portion of the mounting bracket 1 such that the lower portion of the mounting bracket 1 is formed as a width-reduced protrusion portion. In this way, the respective upper end portions of the first arm 4 and third arm 6 are pivotably connected via corresponding pins 10, 11 to the mounting bracket 1 side by side with respect to each other.

However, those having ordinary skill in the related art should appreciate that the respective upper end portions of the first arm 4 and third arm 6 and the lower portion of the mounting bracket 1 can be formed with no notches. Alternatively, the respective upper end portions of the first arm 4 and third arm 6 may be juxtaposed to the lower portion of the mounting bracket 1 directly. The term "juxtaposed" as used herein means that neither the first arm 4 nor third arm 6 is inserted into the mounting bracket 1 (as compared to the first arm 4 and third arm 6 of the fourth embodiment) and the mounting bracket 1 is not inserted into the first arm 4 and third arm 6 (as compared to the mounting bracket 1 of the first through third embodiments). Namely, the respective upper end portions of the first arm 4 and third arm 6 are connected to the mounting bracket 1 side by side with respect to each other.

Figure 8:
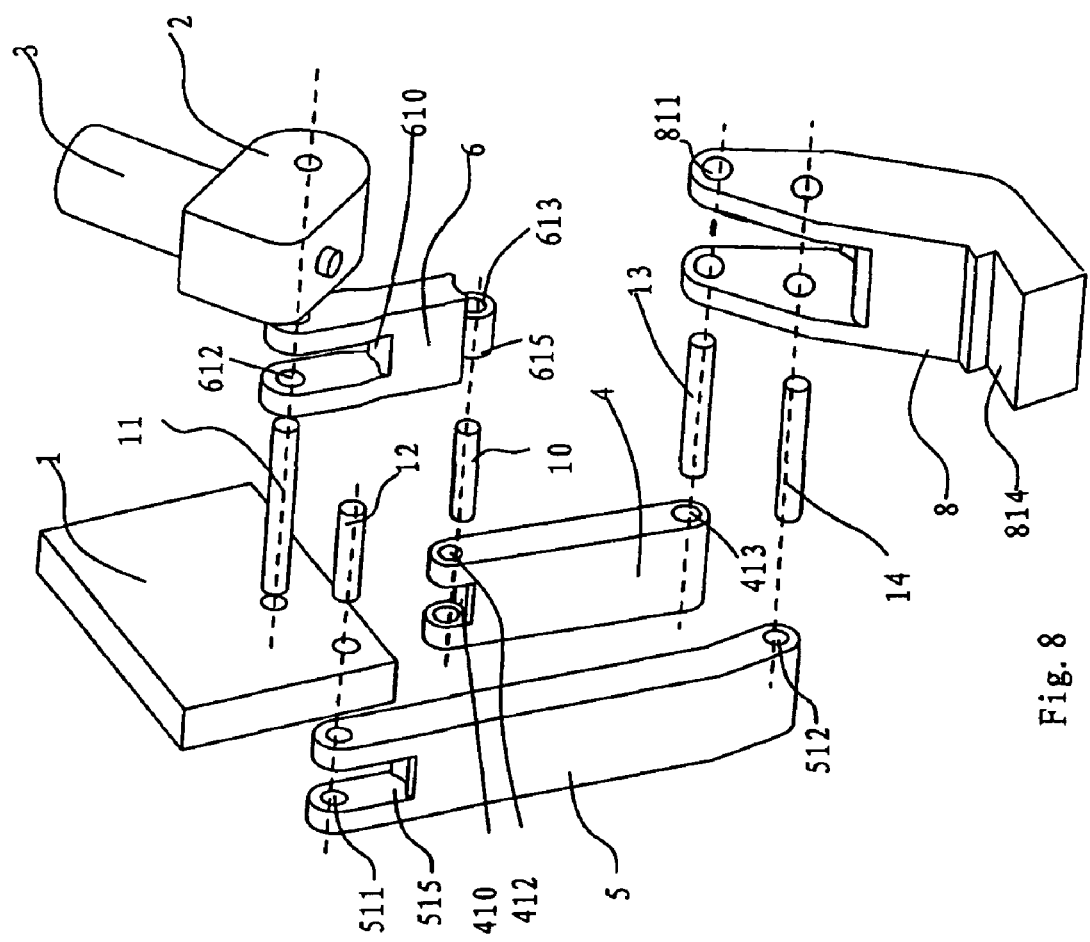
FIG. 8 is an exploded schematic view of a sixth embodiment of the extending and retracting device for a vehicle step apparatus of the present invention.
Figure 10:
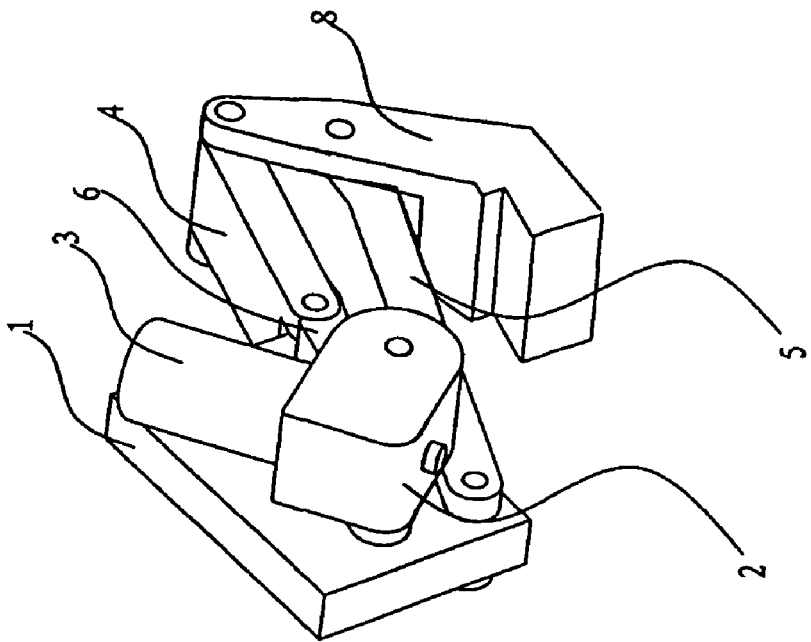
FIG. 10 is a schematic view of the sixth embodiment of the extending and retracting device for a vehicle step apparatus of the present invention shown disposed in a retracted state.
Figure 9:
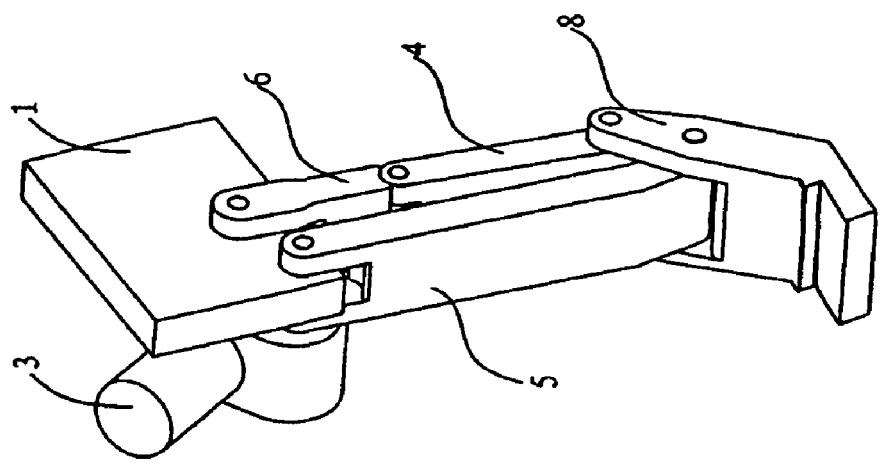
FIG. 9 is a schematic view of the sixth embodiment of the extending and retracting device for a vehicle step apparatus of the present invention shown disposed in an extended state.

With reference to FIGS. 8 through 10, a sixth embodiment of the extending and retracting device for a vehicle step apparatus of the present invention will now be described. Those having ordinary skill in the related art should appreciate that structure and operation of the sixth embodiment is similar to those of the first embodiment. Accordingly, the description that follows focuses upon differences between the first and sixth embodiments.

In the sixth embodiment, the lower end portion of the third arm 6 is rotatably connected to the upper end portion of the first arm 4, the upper end portion of the third arm 6 is rotatably connected to the mounting bracket 1, and the lower end portion of the first arm 4 is rotatably connected to the step bracket 8. The upper end portion of the second arm 5 is rotatably connected directly to the mounting bracket 1, and the lower end portion of the second arm 5 is rotatably connected to the step bracket 8.

More specifically and as shown in FIG. 8, the lower end portion of the third arm 6 is formed as a protrusion portion 615, groove 410 is formed in the upper end portion of the first arm 4, and the protrusion portion 615 is inserted into groove 410 and pivotably connected via pin 10 to the first arm 4. The respective lower end portions of the first arm 4 and second arm 5 are pivotably connected to the step bracket 8 via corresponding pins 13, 14.

FIG. 9 shows the extending and retracting device of the sixth embodiment disposed in the extended state, and FIG. 10 shows the extending and retracting device of the sixth embodiment disposed in the retracted state. In the sixth embodiment, the driving device drives the extending and retracting device by driving the third arm 6.

Figure 11:
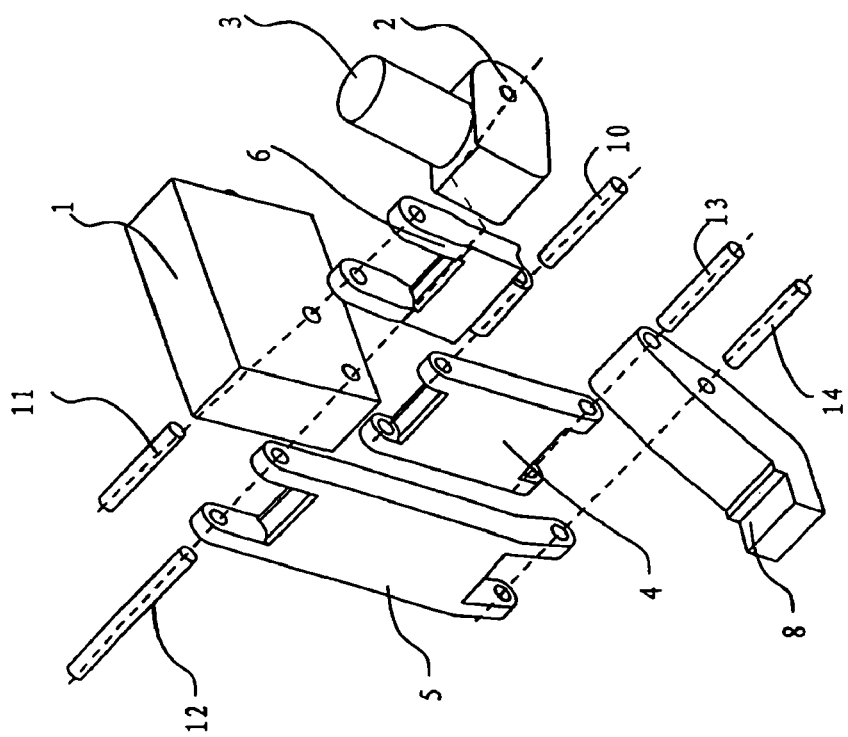
FIG. 11 is an exploded schematic view of a seventh embodiment of the extending and retracting device for a vehicle step apparatus of the present invention.

With reference to FIG. 11, a seventh embodiment of the extending and retracting device for a vehicle step apparatus of the present invention will now be described. Those having ordinary skill in the related art should appreciate that structure and operation of the seventh embodiment is similar to those of the sixth embodiment. Accordingly, the description that follows focuses upon differences between the sixth and seventh embodiments.

In the seventh embodiment, the lower end portion of the first arm 4 is formed with groove 411, and the lower end portion of the second arm 5 is formed with groove 513. The step bracket 8 is inserted into grooves 411, 513 and pivotably connected to the first arm 4 and second arm 5 via corresponding pins 13, 14.

Figure 12:
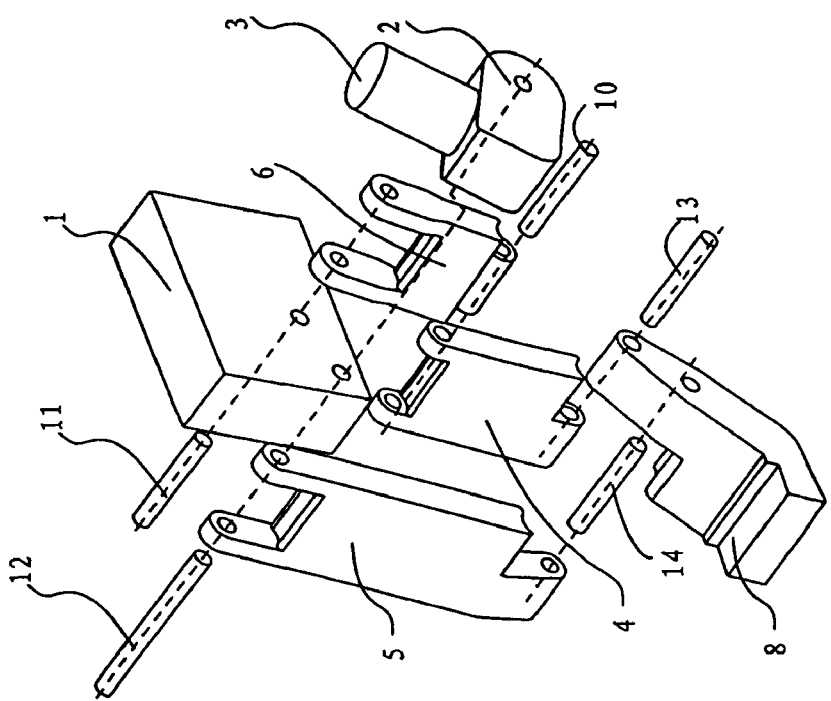
FIG. 12 is an exploded schematic view of an eighth embodiment of the extending and retracting device for a vehicle step apparatus of the present invention.

With reference to FIG. 12, an eighth embodiment of the extending and retracting device for a vehicle step apparatus of the present invention will now be described. Those having ordinary skill in the related art should appreciate that structure and operation of the eighth embodiment is similar to those of the sixth embodiment. Accordingly, the description that follows focuses upon differences between the sixth and eighth embodiments.

In the eighth embodiment, the respective lower end portions of the first arm 4 and second arm 5 are juxtaposed to the step bracket 8. In the sixth through eight embodiments, the upper end portion of the third arm 6 is formed with groove 610, the upper end portion of the second arm 5 is formed with groove 515, and the mounting bracket 1 is inserted into grooves 610, 515. The mounting bracket 1 can be formed with recess 112 (as shown in FIG. 6). In this case, the respective upper end portions of the third arm 6 and second arm 5 are inserted into the recess 112. Those having ordinary skill in the related art should appreciate that the respective upper end portions of the third arm 6 and second arm 5 can be juxtaposed to the mounting bracket 1.

It should be appreciated by those having ordinary skill in the related art that in each of the second through eighth embodiments of the extending and retracting device, each of the pins 10, 11, 13, 14 and protrusion portion 615 can have any suitable shape, size, and structure. It should also be appreciated that each of the recess 112, grooves 410, 411, 513, 515, 610, and notches 113, 414, 415, 514, 614, 813 can have any suitable shape and size. It should also be appreciated that each of the pins 10, 11, 13, 14, protrusion portion 615, recess 112, grooves 410, 411, 513, 515, 610, and notches 113, 414, 415, 514, 614, 813 can have any suitable structural relationship with each other.

With reference to FIGS. 13-15, a first embodiment of the vehicle step apparatus of the present invention will now be described. In general, this embodiment of the vehicle step apparatus includes a step member 9 and first and second extending and retracting devices connected to the step member 9 for moving the step member 9 between an extended position (as shown in FIG. 14) and a retracted position (as shown in FIG. 15). Each of the extending and retracting devices includes a mounting bracket 1 adapted to be fixed to a body of a vehicle. A step bracket 8 is connected to the step member 9. A first arm 4 defines a lower end portion and an upper end portion. The lower end portion is rotatably connected to the step bracket 8. A second arm 5 defines a lower end portion and an upper end portion. The lower end portion is rotatably connected to the step bracket 8. A third arm 6 defines an upper end portion rotatably connected to the mounting bracket 1 and a lower end portion rotatably connected to the upper end portion of the first arm 4 or second arm 5. The upper end portion of the other of the first arm 4 or second arm 5 is rotatably connected to the mounting bracket 1. The vehicle step apparatus also includes first and second driving devices that drive respectively the extending and retracting devices to move the step member 9 between the extended and retracted positions.

More specifically, the mounting bracket 1 can be mounted to the body of the vehicle so as to mount the extending and retracting device to the vehicle. The step member 9 is mounted onto the step brackets 8 of the respective extending and retracting devices. The lower end portion of the first arm 4 is rotatably connected to the step bracket 8. In particular, the lower end portion of the first arm 4 is pivotably connected to the step bracket 8 via pin 13. The upper end portion of the first arm 4 is rotatably connected to the mounting bracket 1. In particular, the upper end portion of the first arm 4 is pivotably connected to the mounting bracket 1 via pin 10. The lower end portion of the second arm 5 is rotatably connected to the step bracket 8. In particular, the lower end portion of the second arm 5 is pivotably connected to the step bracket 8 via pin 14. The upper end portion of the third arm 6 is rotatably connected to the mounting bracket 1. In particular, the upper end portion of the third arm 6 is pivotably connected to the mounting bracket 1 via pin 11. The lower end portion of the third arm 6 is rotatably connected to the upper end portion of the second arm 5. In particular, the lower end portion of the third arm 6 is pivotably connected to the upper end portion of the second arm 5 via pin 12.

In one embodiment, each of the driving devices includes the reversible motor 3 and speed reducer 2. In particular, the reversible motors 3 drive respectively the first arms 4 via the corresponding speed reducers 2 so as to move the extending and retracting devices between the extended and retracted states, thus moving the step member 9 between the extended and retracted positions. Each of the driving devices is not limited to drive the first arm 4 and can drive the second arm 5 or third arm 6. As shown in FIG. 13 and not by way of limitation, the driving devices drive respectively the first arms 4 of the corresponding extending and retracting devices.

In operation of the first embodiment of the vehicle step apparatus and as shown in FIG. 14, the vehicle step apparatus is in the extended state in which the step member is in the extended position. The reversible motors 3 drive respectively the first arms 4 of the extending and retracting devices via the corresponding speed reducers 2 to rotate the first arms 4 in counterclockwise direction relative to the mounting brackets 1, thereby driving the second arms 5 and third arms 6 to rotate in counterclockwise direction relative to the mounting brackets 1 so that the step brackets 8 move upwardly and rearwardly relative to the mounting brackets 1. In this way, the extending and retracting devices move from the extended state (as shown in FIG. 14) to the retracted state (as shown in FIG. 15) while the step member 9 moves from the extended position (as shown in FIG. 14) to the retracted position (as shown in FIG. 15). When the step member 9 is moved from the retracted to extended position so that a passenger may use the step member 9, the reversible motors 3 drive respectively the first arms 4 via the corresponding speed reducers 2 to rotate the first arms 4 in the clockwise direction relative to the mounting brackets 1 so that the extending and retracting devices move from the retracted state (as shown in FIG. 15) to the extended state (as shown in FIG. 14), and the step member 9 moves from the retracted position (as shown in FIG. 15) to the extended position (as shown in FIG. 14) for a passenger stepping on the step member 9.

If rotation of the reversible motor 3 of the first driving device is not synchronous with that of the second driving device and/or rotation of the first extending and retracting device is not synchronous with that of the second extending and retracting device, such asynchronization can be compensated for by relative rotation between the second arms 5 and third arms 6, thus eliminating interference of the first extending and retracting device with the second extending and retracting device. In other words, the vehicle step apparatus employs a five-link mechanism, which increases freedom of movement of each extending and retracting device, and eliminates interference so that operation life and reliability of the vehicle step apparatus and extending and retracting device therefor are increased. Because two driving devices are used to drive respectively two extending and retracting devices, resulting driving forces are increased, and operation of the vehicle step apparatus is very stable.

Figure 16:
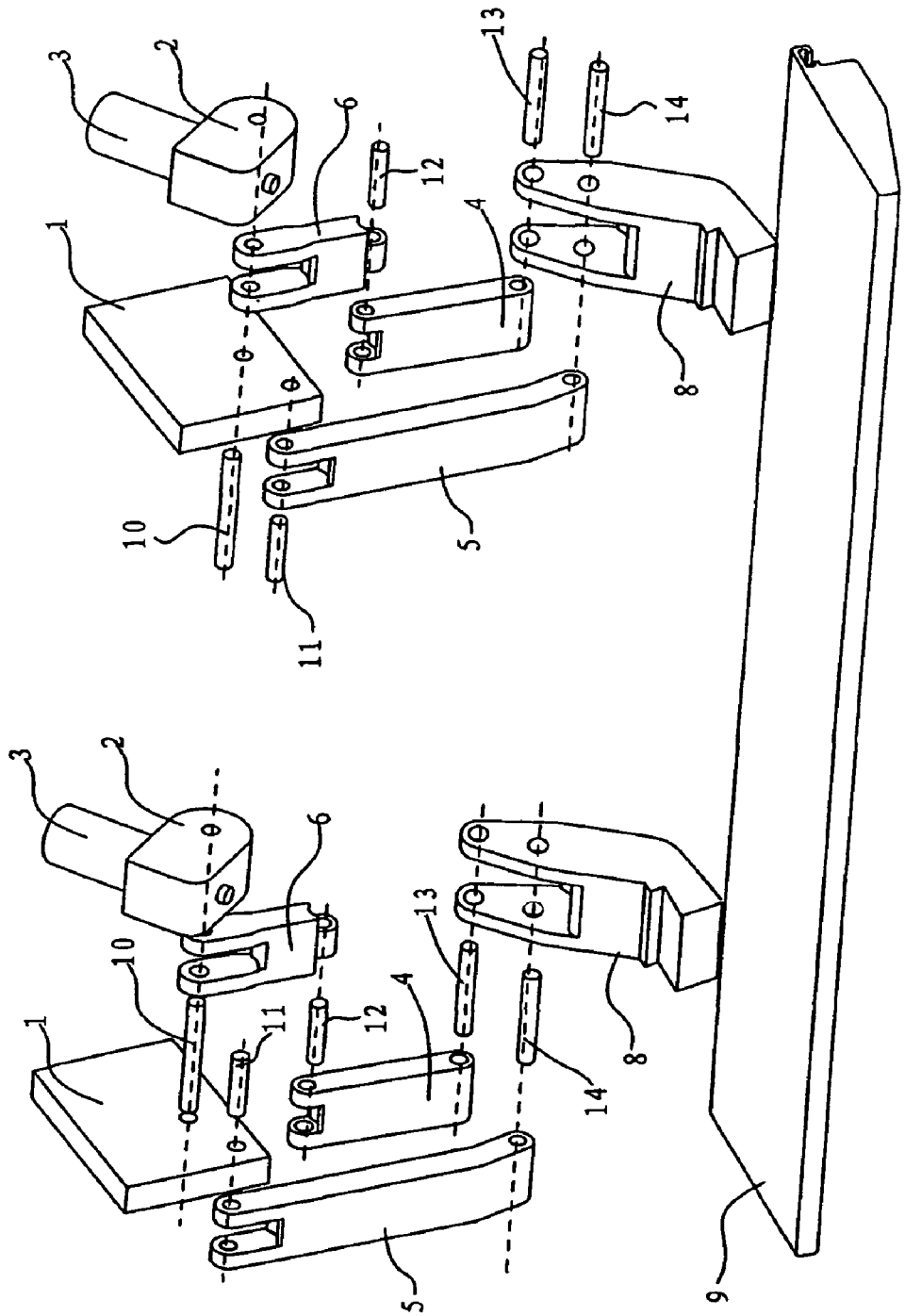
FIG. 16 is an exploded schematic view of a second embodiment of the vehicle step apparatus of the present invention.
Figure 17:
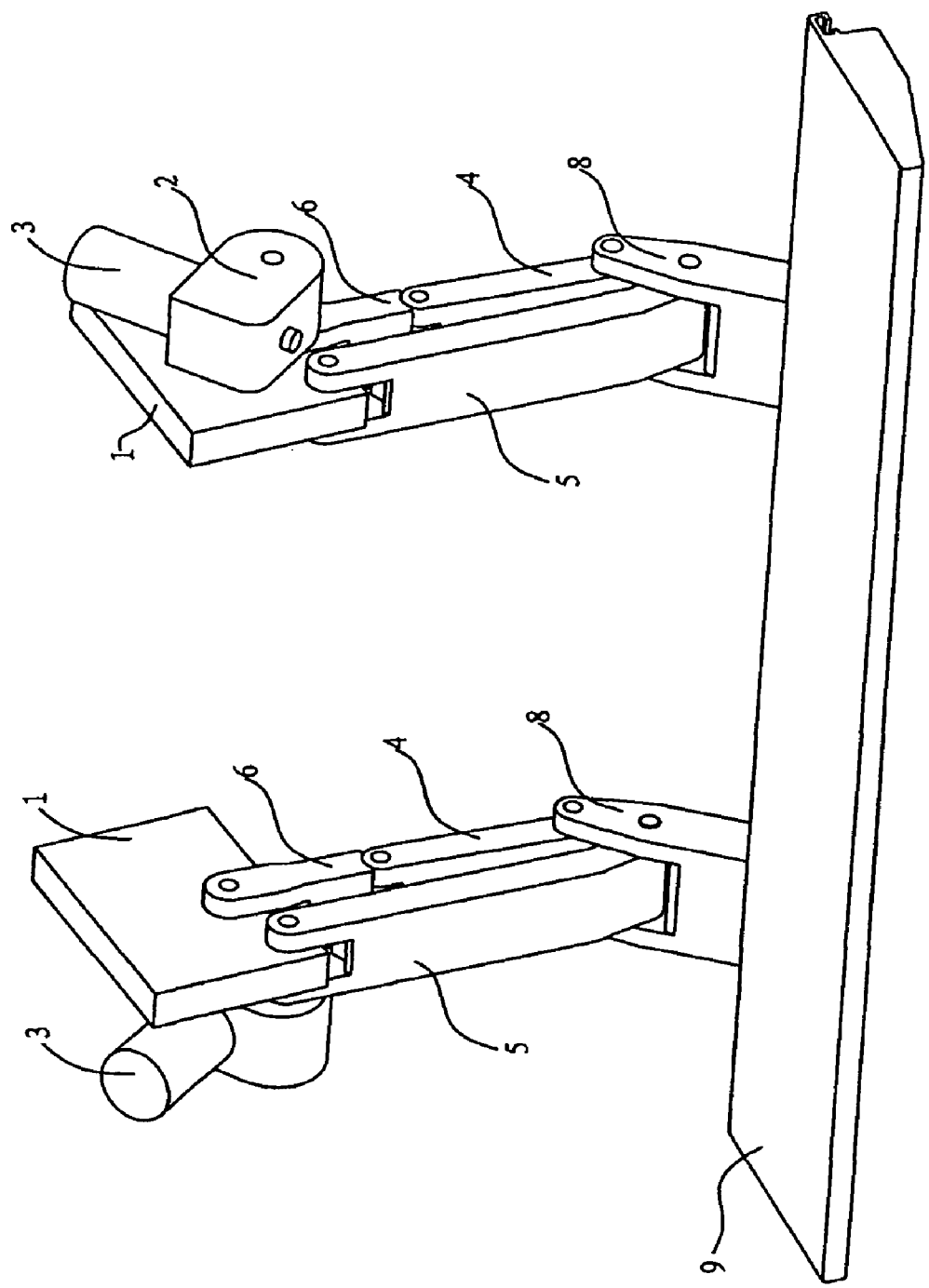
FIG. 17 is a schematic view of the second embodiment of the vehicle step apparatus of the present invention shown disposed in an extended state with the step member being in an extended position.
Figure 18:
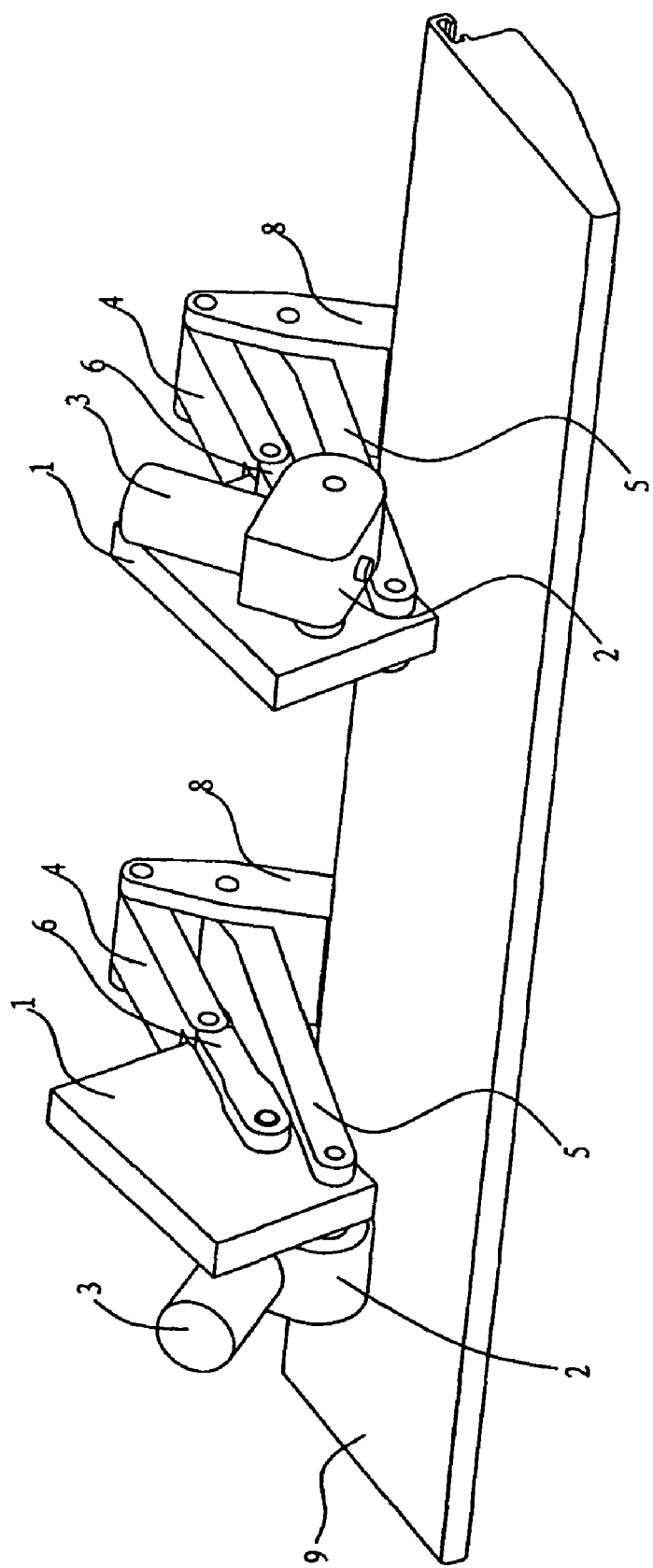
FIG. 18 is a schematic view of the second embodiment of the vehicle step apparatus of the present invention shown disposed in a retracted state with the step member being in a retracted position.

With reference to FIGS. 16 through 18, a second embodiment of the vehicle step apparatus of the present invention will now be described. Those having ordinary skill in the related art should appreciate that structure and operation of the second embodiment is similar to those of the first embodiment. Accordingly, the description that follows focuses upon differences between the first and second embodiments.

With respect to each of the extending and retracting devices, the lower end portion of the third arm 6 is rotatably connected to the upper end portion of the first arm 4. The upper end portion of the third arm 6 is rotatably connected to the mounting bracket 1, and the lower end portion of the first arm 4 is rotatably connected to the step bracket 8. The upper end potion of the second arm 5 is rotatably connected directly to the mounting bracket 1, and the lower end portion of the second arm 5 is rotatably connected to the step bracket 8. The reversible motor 3 drives the third arm 6 via the speed reducer 2. Asynchronization between the extending and retracting devices and/or reversible motors 3 can be compensated for by relative rotation between the third arm 6 and first arm 4, thus eliminating interference of the first extending and retracting device with the second extending and retracting device.

FIG. 17 shows the second embodiment disposed in an extended state with the step member 9 being in an extended position, and FIG. 18 shows the second embodiment disposed in a retracted state with the step member being in a retracted position.

As shown in FIG. 13, the vehicle step apparatus of the first embodiment employs two extending and retracting devices of the first embodiment of the present invention. That is, the extending and retracting devices are identical with each other. As shown in FIG. 16, the vehicle step apparatus of the second embodiment employs two extending and retracting devices of the sixth embodiment of the present invention. That is, the extending and retracting devices are identical with each other. However, those having ordinary skill in the related art should appreciate that the extending and retracting devices can be different from each other. For example, the first extending and retracting device can be any of the first through eighth embodiments of the extending and retracting device of the present invention, and the second extending and retracting device can be any of such embodiments as well.

It should be appreciated by those having ordinary skill in the related art that in each of the first and second embodiments of the vehicle step apparatus, each of the mounting brackets 1, speed reducers 2, reversible motors 3, first arms 4, second arms 5, third arms 6, step brackets 8, step member 9, pins 10, 11, 12, 13, 14, and driving devices can have any suitable shape, size, and structure and structural relationship with each other and the body of the vehicle.

The vehicle step apparatus of the present invention employs a five-link mechanism, is reliable and stable with a long operational life, and eliminates interference occurring between the two extending and retracting devices. In addition, freedom of movement of the vehicle step apparatus is increased, when compared to conventional four-link mechanisms, and the vehicle step apparatus employs the two driving devices to drive respectively the two extending and retracting devices with increased driving force. Moreover, even if rotations of the two driving devices and/or extending and retracting devices are not synchronous, asynchronization can be compensated by relative rotation between the third arm and first or second arm.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An extending and retracting device for a vehicle step apparatus comprising:
   a mounting bracket fixed to a body of a vehicle;
   a step bracket connected to a step member of the vehicle step apparatus;
   a first arm defining a lower end portion thereof rotatably connected directly to said step bracket and an upper end portion thereof;

a second arm defining a lower end portion thereof rotatably connected directly to said step bracket and an upper end portion thereof; and a third arm defining an upper end portion thereof rotatably connected directly to said mounting bracket and a lower end portion thereof rotatably connected directly to said upper end portion of one of said first and second arms, wherein said upper end portion of other of said first and second arms is rotatably connected to said mounting bracket.

2. An extending and retracting device for a vehicle step apparatus as set forth in claim 1, wherein said lower end portion of said third arm is rotatably connected to said upper end portion of said second arm.

3. An extending and retracting device for a vehicle step apparatus as set forth in claim 2, wherein said lower end portion of said third arm is formed with a groove and said upper end portion of said second arm is rotatably inserted into said groove.

4. An extending and retracting device for a vehicle step apparatus as set forth in claim 2, wherein said upper end portion of said third arm is formed with a groove, said upper end portion of said first arm is formed with a groove, and said mounting bracket is inserted into said grooves.

5. An extending and retracting device for a vehicle step apparatus as set forth in claim 2, wherein respective said upper end portions of said third and first arms are juxtaposed with respect to each other and connected to said mounting bracket.

6. An extending and retracting device for a vehicle step apparatus as set forth in claim 1, wherein said lower end portion of said third arm is rotatably connected to said upper end portion of said first arm.

7. An extending and retracting device for a vehicle step apparatus as set forth in claim 6, wherein said upper end portion of said first arm is formed with a groove and said lower end portion of said third arm is rotatably inserted into said groove.

8. An extending and retracting device for a vehicle step apparatus as set forth in claim 6, wherein said upper end portion of said third arm is formed with a groove, said upper end portion of said second arm is formed with a groove, and said mounting bracket is inserted into said grooves.

9. An extending and retracting device for a vehicle step apparatus as set forth in claim 6, wherein respective said upper end portions of said third and second arms are juxtaposed with respect to each other and connected to said mounting bracket.

10. An extending and retracting device for a vehicle step apparatus as set forth in claim 1, wherein said lower end portion of said first arm is formed with a groove, said lower end portion of said second arm is formed with a groove, and said step bracket is inserted into said grooves.

11. An extending and retracting device for a vehicle step apparatus as set forth in claim 1, wherein respective said lower end portions of said first and second arms are juxtaposed with respect to each other and connected to said step bracket.

12. An extending and retracting device for a vehicle step apparatus as set forth in claim 1, wherein said mounting bracket is formed with a recess and respective said upper end portions of said third and other of said first and second arms are inserted into said recess.

13. An extending and retracting device for a vehicle step apparatus as set forth in claim 1, wherein respective said lower end portions of said first and second arms are pivotally connected via corresponding pins to said step bracket, said lower end portion of said third arm is pivotally connected via a pin to said upper end portion of said one of said first and second arms, and respective said upper end portions of said third and other of said first and second arms are pivotally connected via corresponding pins to said mounting bracket.

14. A vehicle step apparatus comprising:

a step member;

first and second extending and retracting devices connected to said step member for moving said step member between an extended position and a retracted position, wherein each of said first and second extending and retracting devices includes:

a mounting bracket fixed to a body of a vehicle;

a step bracket connected to said step member;

a first arm defining a lower end portion thereof rotatably connected directly to said step bracket and an upper end portion thereof;

a second arm defining a lower end portion thereof rotatably connected directly to said step bracket and an upper end portion thereof; and a third arm defining an upper end portion thereof rotatably connected directly to said mounting bracket and a lower end portion thereof rotatably connected directly to said upper end portion of one of said first and second arms, wherein said upper end portion of other of said first and second arms is rotatably connected to said mounting bracket; and first and second driving devices that drive respectively said first and second extending and retracting devices to move said step member between said extended and retracted positions.

15. A vehicle step apparatus as set forth in claim 14, wherein said lower end portion of said third arm is rotatably connected to said upper end portion of said second arm.

16. A vehicle step apparatus as set forth in claim 14, wherein each of said first and second driving devices drives any of said first, second, and third arms of respective said first and second extending and retracting devices to move said step member between said extended and retracted positions.

17. A vehicle step apparatus as set forth in claim 14, wherein said lower end portion of said third arm is rotatably connected to said upper end portion of said first arm.

18. A vehicle step apparatus as set forth in claim 14, wherein each of said first and second driving devices includes a reversible motor.

\* \* \* \* \*